United States Patent
Farooq et al.

(10) Patent No.: US 9,845,115 B2
(45) Date of Patent: Dec. 19, 2017

(54) ONE-PIECE CLOSURE MEMBER FOR A VEHICLE

(71) Applicant: Ford Global Technologies, LLC, Dearborn, MI (US)

(72) Inventors: S. M. Iskander Farooq, Novi, MI (US); Mohammed Omar Faruque, Ann Arbor, MI (US); Dean M. Jaradi, Macomb, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 34 days.

(21) Appl. No.: 15/047,714

(22) Filed: Feb. 19, 2016

(65) Prior Publication Data

US 2017/0241191 A1    Aug. 24, 2017

(51) Int. Cl.
*B62D 25/10*    (2006.01)
*B33Y 80/00*    (2015.01)

(52) U.S. Cl.
CPC ............. *B62D 25/10* (2013.01); *B33Y 80/00* (2014.12)

(58) Field of Classification Search
CPC .... E06B 7/23; B60J 10/18; B60J 10/75; B60J 10/74; B60J 10/265; B29C 47/0014; B29C 47/027; B29C 47/0066; B32B 3/08; B32B 15/08; B32B 2307/712; B32B 2605/08; B32B 2250/03; B29K 2705/00; B29L 2031/3005; B62D 25/10; B62D 25/105

See application file for complete search history.

(56) References Cited

U.S. PATENT DOCUMENTS

| | | | | |
|---|---|---|---|---|
| 4,598,008 A | * | 7/1986 | Vogt | B32B 3/12 296/187.02 |
| 7,150,496 B2 | * | 12/2006 | Fujimoto | B60R 21/34 180/69.22 |
| 7,810,877 B2 | * | 10/2010 | Ishitobi | B60R 21/34 180/69.2 |
| 7,988,222 B2 | * | 8/2011 | Fujimoto | B60R 21/34 296/187.04 |
| 8,276,975 B2 | * | 10/2012 | Kimoto | B32B 5/12 296/181.2 |
| 8,534,410 B2 | * | 9/2013 | Nakaura | B60R 21/38 180/274 |
| 8,740,291 B2 | * | 6/2014 | Hashimoto | B60R 21/34 180/69.2 |
| 8,916,085 B2 | | 12/2014 | Jackson et al. | |
| 9,387,887 B2 | * | 7/2016 | Ishitobi | B62D 25/105 |

(Continued)

FOREIGN PATENT DOCUMENTS

CN    1706575 A    12/2005
CN    104590397 A    5/2015

*Primary Examiner* — Justin Rephann
(74) *Attorney, Agent, or Firm* — Jason Rogers; Brooks Kushman P.C.

(57) ABSTRACT

A closure panel including an outer shell for closing an opening defined by a vehicle body and an inner reinforcement. The outer shell and inner reinforcement are formed as a plurality of additive layers. The inner reinforcement includes an integral thickened edge formed around the periphery of the outer shell, an integral latch buttress provided on a first side of the inner reinforcement and a pair of integral hinge buttresses provided on a second side of the inner reinforcement. Internally threaded protrusions may be formed as additive deposits on the integral buttresses.

14 Claims, 4 Drawing Sheets

(56) References Cited

U.S. PATENT DOCUMENTS

| | | | |
|---|---|---|---|
| 2004/0021342 A1* | 2/2004 | Fujimoto | B60R 21/34 296/193.11 |
| 2006/0158007 A1* | 7/2006 | Seksaria | B62D 25/105 296/193.11 |
| 2006/0290172 A1* | 12/2006 | Hirata | B60R 21/38 296/187.04 |
| 2007/0132279 A1* | 6/2007 | Donabedian | B62D 25/105 296/193.11 |
| 2008/0185871 A1* | 8/2008 | Ishiyama | B60R 21/34 296/187.04 |
| 2009/0302644 A1* | 12/2009 | Mori | B60R 21/38 296/193.11 |
| 2010/0019540 A1* | 1/2010 | Fujimoto | B60R 21/34 296/193.11 |
| 2010/0140979 A1* | 6/2010 | Seksaria | B62D 29/002 296/193.11 |
| 2010/0244484 A1* | 9/2010 | Nakaura | B60R 21/38 296/187.04 |
| 2014/0048971 A1 | 2/2014 | Mannella et al. | |
| 2014/0311651 A1 | 10/2014 | Mech | |
| 2015/0069786 A1* | 3/2015 | Benson | B62D 25/105 296/187.09 |

\* cited by examiner

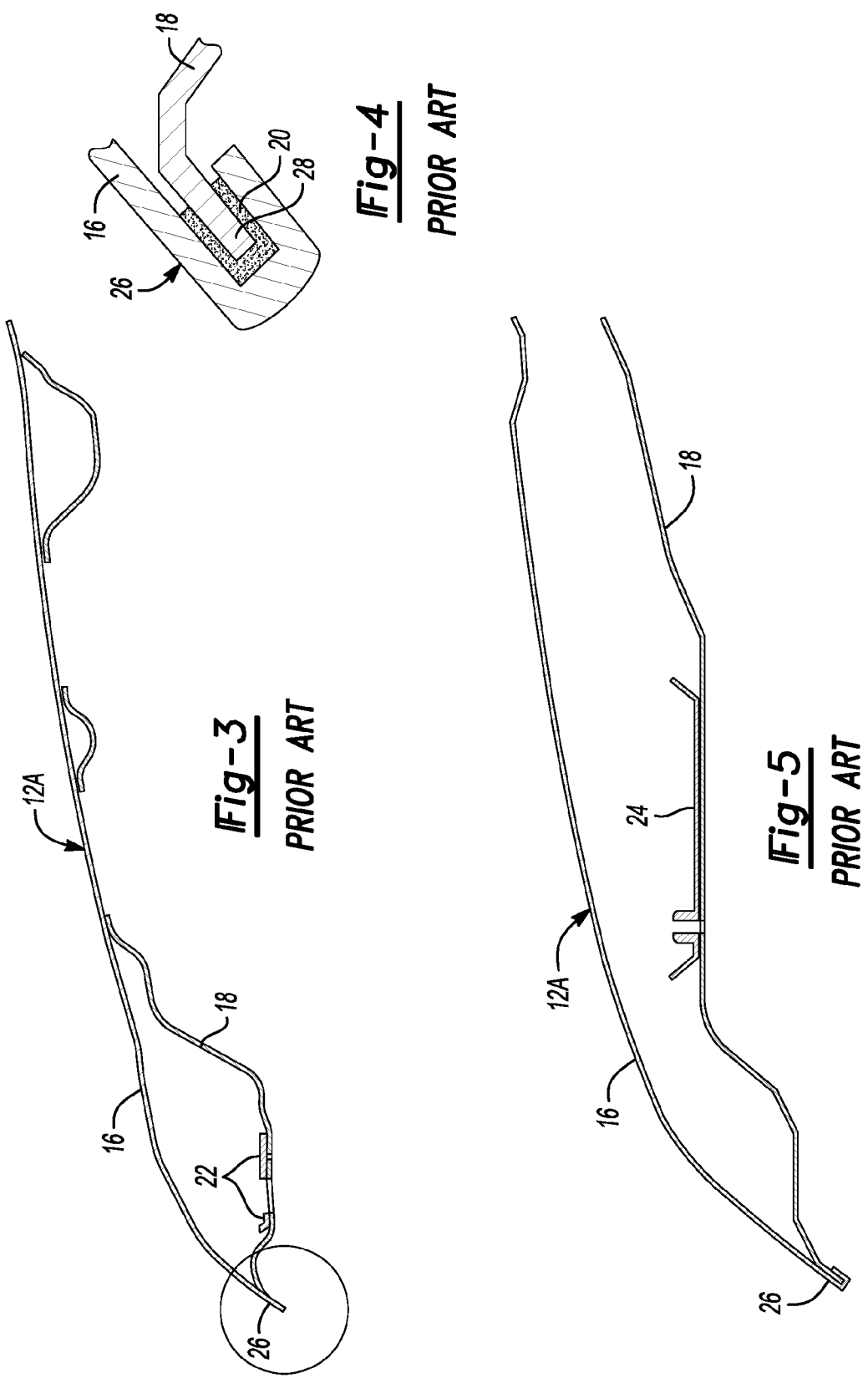

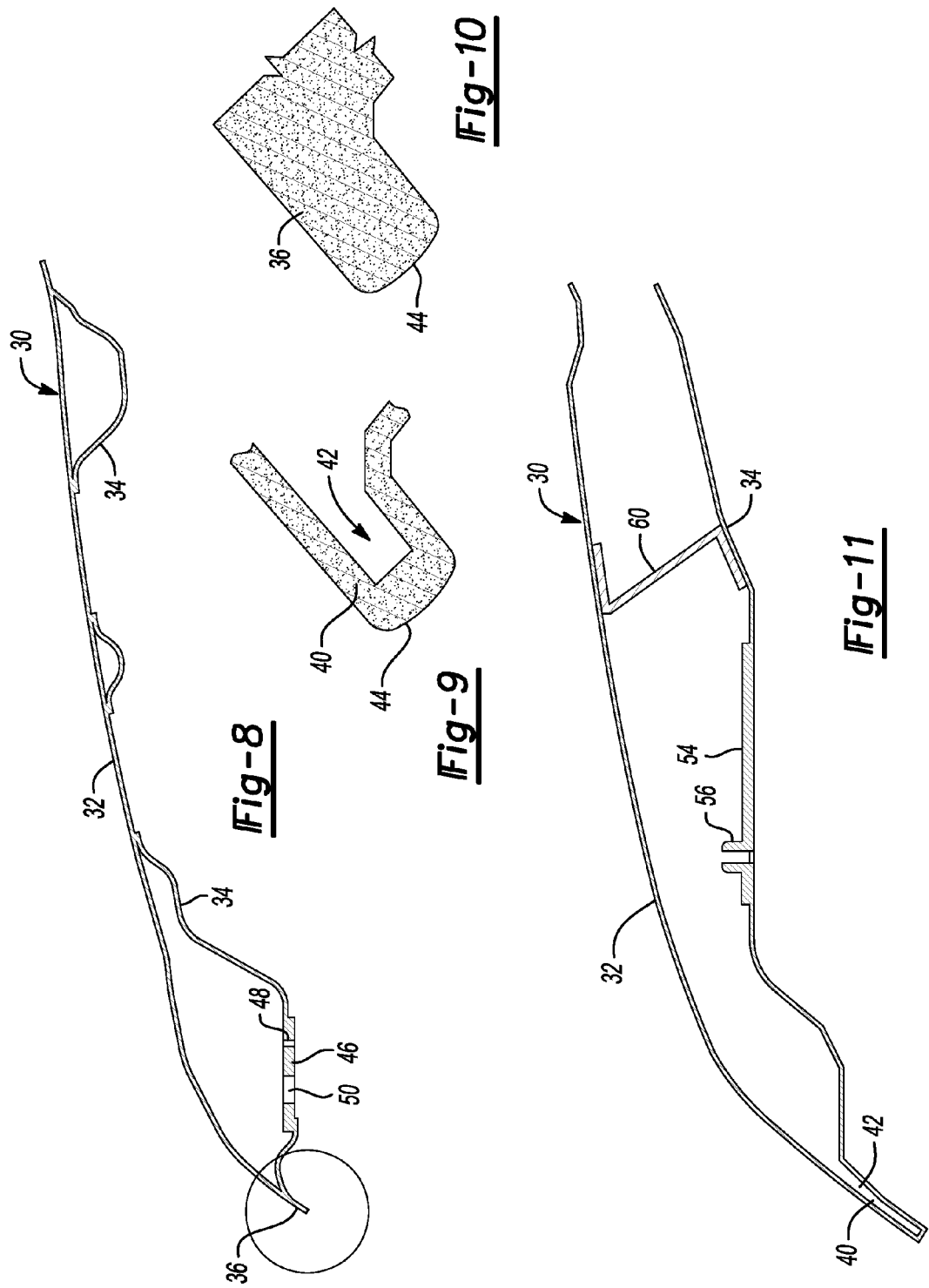

ONE-PIECE CLOSURE MEMBER FOR A VEHICLE

TECHNICAL FIELD

This disclosure relates to a one piece closure member formed by a plurality of additive layers.

BACKGROUND

A conventional vehicle closure assembly, such as a hood assembly, generally consists of a stamped sheet metal hood outer, a stamped hood inner, hood latch, hinge reinforcements, and other reinforcements as needed for strength and stability required for the functionality of the hood assembly. Reinforcements are secured to the hood inner by welding, structural adhesives, threaded fasteners, rivets or similar joining techniques to assemble a hood inner sub-assembly. The hood inner sub-assembly may be joined at the periphery with the hood outer using structural adhesives and a hem flanging process. The large number of component parts assembled together to make a vehicle closure member adds to the cost and complexity of the manufacturing process. The components of a hood assembly may be made from SMC, carbon fiber, steel, aluminum or other metals resulting in problems assembling parts made of dissimilar materials.

Additive manufacturing processes, commonly referred to as 3D printing processes, are used to form objects by sequentially depositing material with a printer and subsequently hardening the deposited material to complete the part manufacturing process. A powder form metal or polymer material and binder may be deposited by a printer head on a 3-D printing machine bed that is later melted to soften the material and then solidified by applying heat or light. Different methods of solidifying the printed layers include selective laser melting (SLM), direct metal laser sintering (DMLS), selective laser sintering (SLS), fused deposition modeling (FDM), fused filament fabrication (FFF), stereo lithography (SLA), and laminated object manufacturing (LOM). Another approach is to extrude thin layers of molten material with an extruder that is later solidified.

Additive manufacturing processes utilize computer aided design (CAD) data or data from another electronic data source to produce 3D objects. The CAD is provided to a 3D printer to produce objects directly from the CAD data.

Prototype automotive parts have been made with additive processes but the time required to produce parts in high volumes has prevented the adoption of additive processes for manufacturing. Potential advantages of adopting additive manufacturing processes include eliminating the need to develop stamping die sets and welding or joining robots and tools to join multiple parts of an assembly together.

The above problems and other problems are addressed by this disclosure as summarized below.

SUMMARY

According to one aspect of this disclosure, a one piece closure panel is provided for a vehicle. The closure panel includes an outer shell forming part of an outer surface of a vehicle and an inner portion. The inner portion includes a thickened, radiused edge that extends around a periphery of the outer shell on an inner surface of the outer shell. The inner portion includes a latch buttress formed on the inner surface of the outer shell. The inner portion also includes first and second hinge buttresses formed on the inner surface of the outer shell.

The thickened edge may define a slot-shaped void between the inner portion and the outer shell that extends around the periphery of the outer shell and is open toward the interior of the panel.

The latch buttress may be an additive deposit on a front portion of the closure panel. The first and second hinge buttresses may be additive deposits on a rear portion of the closure panel. The outer shell, the peripheral thickened edge, the latch mounting portion and the first and second hinge mounting portions may all be part of a unitary one-piece structure.

The latch buttress may further comprise an internally threaded protrusion extending from an internal surface of the front portion toward the outer panel. The latch buttress may define a space between the latch buttress and the outer panel.

The hinge buttress may further comprise an internally threaded protrusion extending from an internal surface of the rear portion toward the outer panel. The hinge buttress may define a space between the hinge buttress and the outer panel.

The closure panel may further comprise an edge facing outwardly from the periphery of the outer shell. The edge is outboard of the outer shell and the inner portion. The edge may be a radiused wall extending around the periphery of the closure panel.

According to another aspect of this disclosure, the outer shell may be formed by a first plurality of additive deposited layers having a thickness $T_1$. The inner portion, thickened edge, latch buttress and the first and second hinge buttresses may be formed by a second plurality of additive deposited layers having a thickness $T_2$ that is thicker than $T_1$.

The closure panel may further comprise an interstitial energy absorbing element disposed between the outer shell and the inner portion at a location where the outer shell and the inner portion define a cavity. The interstitial energy absorbing element may be a resilient wall extending from the outer shell to the inner portion. The wall may include a plurality of discrete wall portions that are connected at an angle to adjacent wall portions. The interstitial energy absorbing portion may comprise a plurality of integrally formed additive deposited layers that exert a spring force on the outer shell and the inner portion.

According to another aspect of this disclosure, a closure panel is disclosed that includes an outer shell for closing an opening defined by a vehicle and an inner reinforcement. The outer shell and inner reinforcement are formed as a plurality of additive layers. The inner reinforcement includes a radiused styling edge formed around the periphery of the outer shell, a latch buttress provided on a first side of the inner reinforcement and a pair of hinge buttresses provided on a second side of the inner reinforcement.

The closure panel may further comprise an interstitial energy absorbing element including a plurality of discrete wall portions that are connected at an angle to adjacent wall portions to form a living hinge.

The above aspects of this disclosure and other aspects are described below with reference to the attached drawings.

BRIEF DESCRIPTION OF THE DRAWINGS

FIG. 3 is a prior art cross-sectional view of a closure panel including a hood latch reinforcement.

FIG. 4 is a fragmentary cross-sectional view of the prior art closure panel showing a hem flange.

FIG. 5 is a prior art fragmentary cross-sectional view of a closure panel showing a hinge reinforcement plate.

FIG. 8 is a cross-sectional view of the one-piece closure panel showing a latch buttress.

FIG. 9 is a fragmentary cross-sectional view showing one embodiment of a thickened, radiused edge taken in the circle in FIG. 8.

FIG. 10 is a fragmentary cross-sectional view of another embodiment of the thickened, radiused edge of the closure panel.

FIG. 11 is a cross-sectional view of the one-piece closure panel showing a hinge buttress portion.

DETAILED DESCRIPTION

The illustrated embodiments are disclosed with reference to the drawings. However, it is to be understood that the disclosed embodiments are intended to be merely examples that may be embodied in various and alternative forms. The figures are not necessarily to scale and some features may be exaggerated or minimized to show details of particular components. The specific structural and functional details disclosed are not to be interpreted as limiting, but as a representative basis for teaching one skilled in the art how to practice the disclosed concepts.

Figure 1:
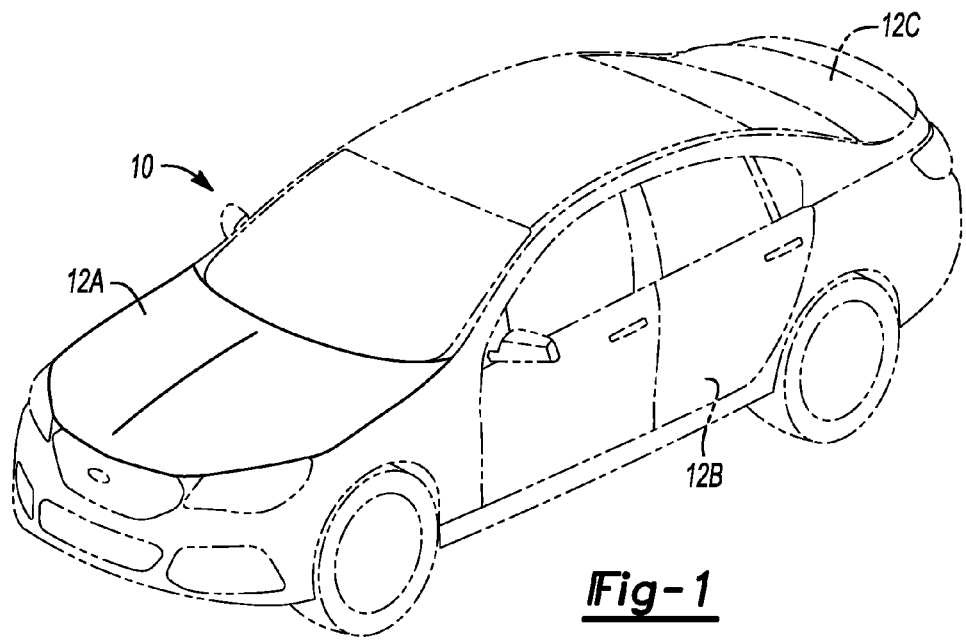
FIG. 1 is a perspective view of a vehicle.

Referring to FIG. 1, a vehicle 10 is illustrated that includes several closure panels 12. One closure panel illustrated is a hood 12A. Alternatively, the closure panel 12 may be a door 12B or a deck lid 12C. The scope of this disclosure should be interpreted to include a vehicle having a one-piece closure panel that may be either a hood 12A, a door 12B, or deck lid 12C.

Figure 2:
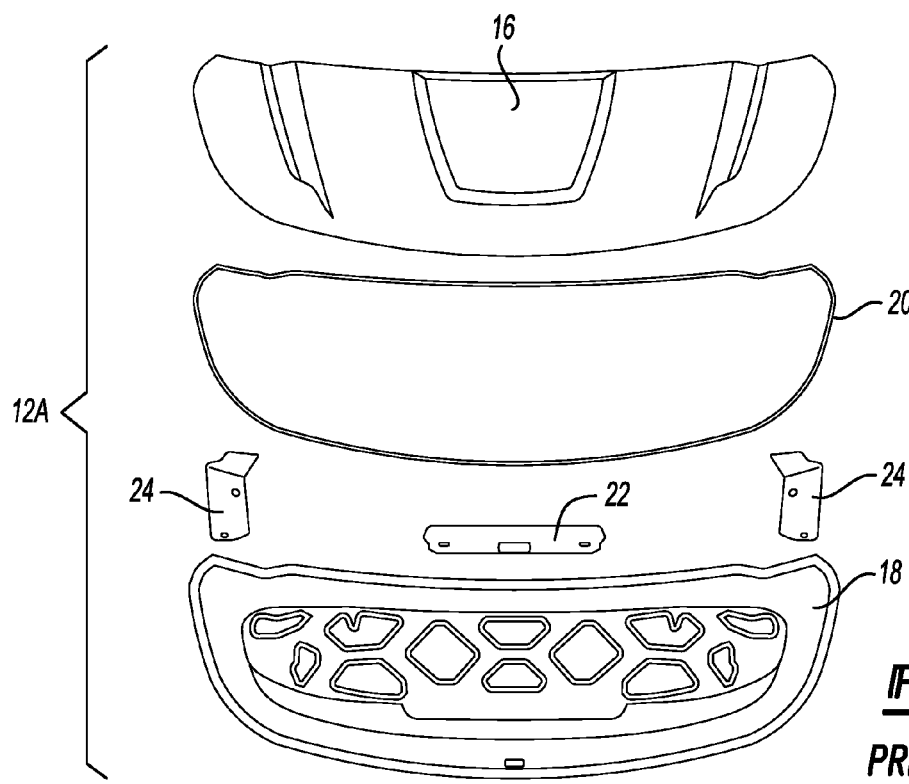
FIG. 2 is an exploded perspective view of a prior art vehicle closure panel.

Referring to FIG. 2, a prior art hood 12A is illustrated in an exploded perspective view. The hood 12A includes an outer panel 16 that is joined to an inner panel 18. A deposit of adhesive 20 is illustrated that is applied to either the outer panel 16 or inner panel 18 about the perimeter of the closure panel 12. A latch mounting plate 22 is assembled to the inner panel 18. A pair of hinge mounting plates 24 is assembled to the inner panel 18. A latch (not shown) is adapted to be secured to the latch mounting plate 24. A pair of hinges (not shown) is adapted to be attached to the hinge mounting plates 24.

Referring to FIGS. 3 and 4, a prior art hood 12A is partially illustrated in cross section. The hood 12A includes the outer panel 16 and inner panel 18 that are joined together at a hem flange 26. A latch mounting plate 22 is attached to the inner panel 18 by welding or by fasteners. The latch mounting plate 22 is adapted to receive a hood latch and may include a striker rod that may be attached to or formed as part of the latch mounting plate 22. In FIG. 4, a prior art outer panel 16 is formed into the hem flange 26 and encloses an internal flange 28 and adhesive 20. The internal flange 28 is part of the inner panel 18. The hem flange 26 and adhesive 20 are used to securely attach the inner panel 18 to the outer panel 16.

Referring to FIG. 5, a fragmentary cross-sectional view of a prior art hood 12A is provided that illustrates how the outer panel 16 is attached to the inner panel 18 with a hinge mounting plate 24. The hinge mounting plate 24 is assembled by using fasteners, welding or adhesive to the inner panel 18. The outer panel 16 is connected by a hem flange 26 to the inner panel 18.

Figure 6:
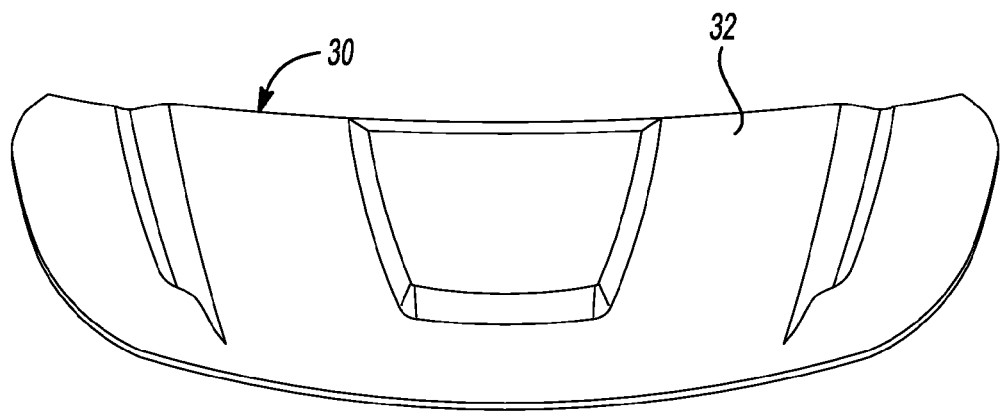
FIG. 6 is a top plan view of a one-piece closure panel.

Referring to FIG. 6, a one-piece closure panel 30 is illustrated that includes an outer skin 32. The outer skin 32 may be formed with finer metal powder (e.g., 0.7 mils) or laid down in a thinner layer to improve the surface finish of the outer skin 32. The inner portion 34 is not a Class-A surface and may be made in thicker layers or with larger powder particles (e.g., 2.5 mils). For example, the layers forming the outer skin 32 may have a thickness $T_1$ of 0.01 mm and the inner portion 34 may have a thickness $T_2$ of 0.05 mm. The outer skin 32 printed using smaller particles accumulates in thinner layers. The inner portion 34 may be formed of thicker particles that are applied in thicker layers. By providing a thinner layer, it is believed that the outer skin 32 of the one-piece closure panel 30 may be solidified into a smoother surface.

Different nozzles may be used to facilitate different application rates or to save time during the manufacturing process. Alternatively, one nozzle may be used to form both the outer skin 32 and the inner portion 34.

Figure 7:
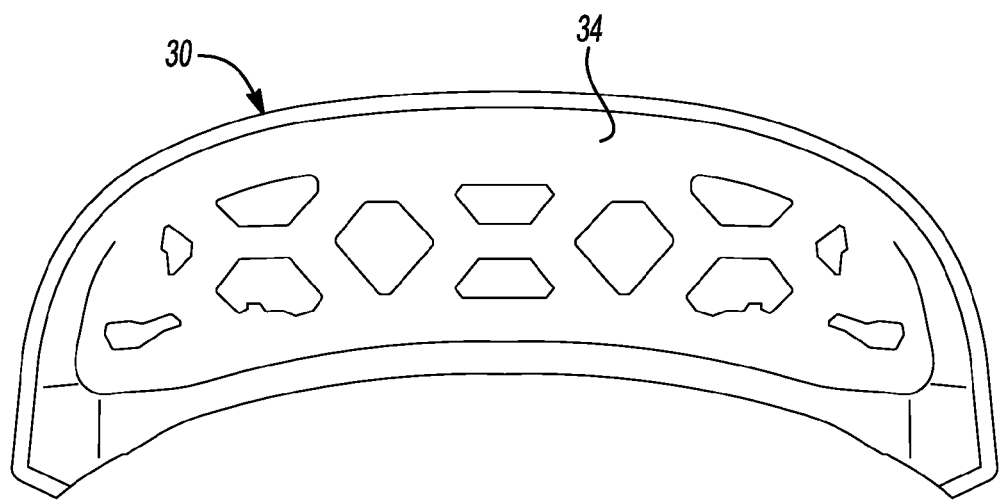
FIG. 7 is a bottom plan view of a one-piece closure panel.

Referring to FIG. 7, the one-piece closure panel 30 is shown inverted to illustrate the structure of the inner portion 34 of the one-piece closure panel 30.

Referring to FIG. 8, the one-piece closure panel 30 is shown with the outer skin 32 attached to the inner portion 34 at a thickened edge 36. The thickened edge 36 may have a radius of about 2.5 mm. The hollow edge 40 including the slot-shaped void 42 is intended of be of lighter weight, but may also provide a 2.5 mm radius styling edge.

A latch buttress 46 is formed on the inner portion 34. The inner portion 34 and latch buttress 46 define striker rod holes 48 that are adapted to receive a striker rod of the hood latch mechanism. The inner portion 34 and latch buttress 46 also define a striker rod access hole 50 that are adapted to receive a hood latch that is accessible through the striker rod access hole 50.

Referring to FIG. 9, one embodiment of the thickened edge 36 is shown. The thickened edge 36 shown in FIG. 9 is a hollow thickened edge 36 that includes a hollow inner edge area 40 that defines a slot-shaped void 42.

In another alternative embodiment, FIG. 10 illustrates a thickened edge 36 that is solid. In both FIGS. 9 and 10, a radiused edge 44 is provided on the closure panel that resembles the hem flange 26 of prior art closure structures.

Referring to FIG. 11, the one-piece closure panel 30 is shown in an area where a hinge (not shown) is to be installed. The one-piece closure panel 30 is integrally formed with the inner portion 34 and the outer skin 32. The thickened edge 36 extends about the one-piece closure panel 30. In the embodiment shown in FIG. 11, the thickened edge 36 is a hollow edge 40 that includes a slot-shaped void 42. A hinge buttress 54 is integrally formed as part of the inner portion 34. The hinge buttress 54 is adapted to receive the hinge (not shown) of the closure panel 30. One or more threaded protrusions 56 may be formed as part of the hinge buttress 54. The threaded protrusions 56 receive a threaded fastener that is used to connect the hinge to the hinge buttress 54 and inner portion 34 of the one-piece closure panel 30.

The one-piece closure panel 30 is manufactured on a 3-D printing machine that is also be referred to as an additive manufacturing process. In the additive manufacturing process, layers of metal powder are printed onto a printing bed with additional layers of the powdered metal being applied to previously deposited layers. Each layer is cured by applying heat or light that solidifies the printed layer. Selective laser melting (SLM), direct metal laser sintering (DMLS), selective laser sintering (SLS), fused deposition modeling (FDM), fused filament fabrication (FFF), stereo lithography (SLA) and laminated object manufacturing (LOM) may be used to solidify the printed layers. The one-piece closure panel 30 may be oriented in the 3-D printing machine to print the front, the rear, or one of the sides of the one-piece closure panels initially and then build upon the initial deposit.

Referring to FIG. 11, a spring 60 may be integrally formed between the outer skin 30 and the inner portion 34 to provide additional resilience in selected areas of the one-piece closure panel 30. The spring element may be a Z-shape, S-shape or an elongated leaf spring element. The spring element 60 may be used to locally strengthen the one-piece closure panel 30 or provide additional resilience and energy absorption.

The openings 48 and 50 (shown in FIG. 8) and the threaded protrusions 56 (shown in FIG. 11) may be formed by selective depositing of the printed metal powder or by applying the metal powder over an entire area and then selectively sintering or melting the powder after it is deposited to leave areas that may become voids in the finished one-piece closure panel 30. The slot-shaped void 42 (shown in FIGS. 9 and 11) may also be formed by selectively depositing and sintering the powdered metal or by depositing the powdered metal throughout the thickened edge or hollow edge 40 and selectively melting or sintering the powdered metal on either side of the slot-shaped void 42.

The embodiments described above are specific examples that do not describe all possible forms of this disclosure. The features of the illustrated embodiments may be combined to form further embodiments of the disclosed concepts. The words used in the specification are words of description rather than limitation. The scope of the following claims is broader than the specifically disclosed embodiments and also includes modifications of the illustrated embodiments.

What is claimed is:

1. A closure panel formed of bonded layers of powder comprising:
   an outer shell having a thickness T forming part of an outer surface of a vehicle;
   an inner shell having selected portions that are thicker than T including:
      an integral edge extending around a periphery of the inner shell;
      an integral latch buttress formed on the inner shell; and
      first and second integral hinge buttresses formed on the inner shell.

2. The closure panel of claim 1 wherein the integral edge defines a slot-shaped void between the inner shell and the outer shell that extends around the periphery of the outer shell and is open toward an interior of the closure panel.

3. The closure panel of claim 1 wherein the integral latch buttress is provided on a front portion of the inner shell of the closure panel.

4. The closure panel of claim 1 wherein the first and second integral hinge buttresses are provided on a rear portion of the inner shell of the closure panel.

5. The closure panel of claim 1 wherein the outer shell, the inner shell, the integral edge, the integral latch buttress and the first and second integral hinge buttress are a unitary one-piece structure.

6. The closure panel of claim 1 wherein the integral latch buttress further comprises:
   a protrusion extending from an internal surface of the integral latch buttress toward the outer shell.

7. The closure panel of claim 1 wherein the integral latch buttress defines a space between the integral latch buttress and the outer shell.

8. The closure panel of claim 1 wherein the integral hinge buttresses further comprise:
   a threaded protrusion extending from an internal surface of each integral hinge buttress toward the outer shell.

9. The closure panel of claim 1 wherein each of the integral hinge buttresses define a space between the integral hinge buttress and the outer shell.

10. The closure panel of claim 1 wherein the integral edge includes a radiused wall extending around the periphery of the closure panel.

11. A closure panel comprising:
    an outer shell forming part of an outer surface of a vehicle;
    an inner shell including an integral edge extending around a periphery of the inner shell;
    an integral latch buttress formed on the inner shell;
    first and second integral hinge buttresses formed on the inner shell; and
    an interstitial energy absorbing portion includes a resilient wall between the outer shell and the inner shell, the wall extending from the outer shell to the inner shell at a location where the outer shell and the inner shell define a cavity, wherein the interstitial energy absorbing portion includes a plurality of integrally formed bonded layers of powder that exert a spring force on the outer shell and the inner shell.

12. A closure panel comprising:
    an outer shell for closing an opening defined by a vehicle; and
    an inner reinforcement simultaneously formed with the outer shell as a plurality of bonded powder layers, the inner reinforcement including:
       a styling edge formed around a periphery of the outer shell;
       a latch buttress provided on a first side of the inner reinforcement; and
       a pair of hinge buttresses provided on a second side of the inner reinforcement, wherein the outer shell is formed by a first plurality of bonded powder layers having a thickness T and the inner reinforcement, styling edge, latch buttress, and the pair of first and second hinge buttresses are formed by a second plurality of bonded powder layers having a thickness that is thicker than T.

13. The closure panel of claim 12 wherein the styling edge defines a slot-shaped void between the inner reinforcement and the outer shell that extends around a periphery of the outer shell and is open toward an interior of the closure panel.

14. The closure panel of claim 12 further comprising:
    an interstitial energy absorbing element disposed between the outer shell and the inner reinforcement at a location where the outer shell and the inner reinforcement define a cavity, wherein the interstitial energy absorbing element is a resilient wall extending from the outer shell to the inner reinforcement, and wherein the wall includes a plurality of discrete wall portions that are connected at an angle to adjacent wall portions.

* * * * *